(12) United States Patent
Djuknic et al.

(10) Patent No.: US 7,505,506 B1
(45) Date of Patent: Mar. 17, 2009

(54) SYSTEM AND METHOD FOR GENERATING SINGLE SIDEBAND, CONSTANT ENVELOPE, SPREAD SPECTRUM SIGNALS WITH MULTIPLE SPREADING CODES

(75) Inventors: Goran Djuknic, Tenafly, NJ (US); Chi Chiu Chan, Wayne, NJ (US); Robert W. Smid, Wyckoff, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 624 days.

(21) Appl. No.: 11/067,148

(22) Filed: Feb. 25, 2005

(51) Int. Cl.
*H04B 1/00* (2006.01)

(52) U.S. Cl. .................. 375/130; 375/260; 375/272; 375/285; 375/343; 370/319; 370/320; 370/321; 370/330; 370/335; 370/342; 370/345; 370/347; 342/150; 342/151; 342/152; 342/153; 342/154; 342/155; 333/193; 333/194; 333/195; 333/196

(58) Field of Classification Search ............... 375/130, 375/260, 272, 285, 343, 367; 370/319–321, 370/330, 335, 342, 345, 347; 342/333, 150–155, 342/193–196

See application file for complete search history.

(56) References Cited

U.S. PATENT DOCUMENTS

| | | | | |
|---|---|---|---|---|
| 5,920,237 | A * | 7/1999 | Park et al. ............... | 332/103 |
| 6,009,074 | A * | 12/1999 | Kim et al. ............... | 370/209 |
| 6,307,892 | B1 * | 10/2001 | Jones et al. ............. | 375/296 |
| 6,335,951 | B1 | 1/2002 | Cangiani et al. | |
| 6,563,881 | B1 * | 5/2003 | Sakoda et al. ............ | 375/260 |
| 7,039,122 | B2 * | 5/2006 | Dragonetti ............... | 375/295 |
| 7,046,739 | B2 * | 5/2006 | Pilcher .................... | 375/296 |
| 2002/0075907 | A1 * | 6/2002 | Cangiani et al. .......... | 370/535 |
| 2002/0150068 | A1 | 10/2002 | Orr et al. | |
| 2003/0072385 | A1 * | 4/2003 | Dragonetti ............... | 375/295 |

OTHER PUBLICATIONS

Mohan Ananda et al (1993 IEEE Millitary communications conference, Oct. 11-14, 1993, Boston, maschusetts).*
Ke Y. Park ("Quadrature-Multiplex Modulation system with application to the orbiter's Ku-band link", National Telecommunications Conference, New orleans, La, Dec. 1-3, 1975, conference record. vol. 2. (A77-15115 04-32) New York, Institude of Electrical and Electronics Engineers, Inc., 1975, p. 33-22 to 33-26).*
S. Butman et al., "Interplex-An Efficient Multichannel PSK/PM Telemetry System", IEEE Transactions on Communications, Jun. 1972, pp. 415-417.
S.L. Hahn, "Hilbert Transforms In Signal Processing", pp. 88-90, pp. 397 and pp. 3-5.

* cited by examiner

*Primary Examiner*—Shuwang Liu
*Assistant Examiner*—Helene Tayong
(74) *Attorney, Agent, or Firm*—Ratner Prestia (57) ABSTRACT

A method of generating a composite signal includes the steps of: (a) generating a plurality of sub-carriers, each sub-carrier having a different frequency position in a frequency spectrum; (b) generating a plurality of codes; and (c) forming a plurality of code combinations from the plurality of codes generated in step (b). The method also includes the steps of (d) first modulating each sub-carrier using a respective one of the code combinations formed in step (c) to form a plurality of modulated sub-carriers; and (e) second modulating in-phase and quadrature components of a base carrier using the plurality of modulated sub-carriers to form the composite signal having multiple carriers. The composite signal is a constant envelope signal, and a single sideband signal.

20 Claims, 10 Drawing Sheets

SYSTEM AND METHOD FOR GENERATING SINGLE SIDEBAND, CONSTANT ENVELOPE, SPREAD SPECTRUM SIGNALS WITH MULTIPLE SPREADING CODES

TECHNICAL FIELD

The present invention relates, in general, to generating communication signals. More specifically, the present invention relates to a system and method of generating single sideband, constant envelope, spread spectrum signals.

BACKGROUND OF THE INVENTION

As an example of modern communication spread spectrum signals, the following is a description of known signals broadcast by Global Positioning System (GPS), which includes 24 satellites orbiting the Earth.

In GPS, each satellite broadcasts carrier signals on the same frequencies. Navigational data is spread by a clear acquisition (C/A) code and modulated on the L1 (1575.42 MHZ) in-phase channel. The navigational data is further spread by a P(Y) code and modulated on both the L1 quadrature and L2 (1227.60 MHZ) in-phase channels.

As both military and civilian requirements for GPS change, a condition which will likely continue into the 21$^{st}$ century, operational modifications become increasingly necessary. Many of these modifications revolve around the waveform structure of GPS.

One of the requirements that has changed since awarding of a contract for the next generation GPS satellites (Block IIF) is a requirement for an additional military signal on the same L band carrier as the C/A and P(Y) signals. An Interplex modulation technique is used to combine the three signals.

Interplex modulation is a technique for combining three or more signals to generate a constant envelope composite signal. A constant envelope composite signal is highly desirable, because it allows a highly efficient power amplifier to be utilized.

As an example, for three signals, S1, S2 and S3, Interplex modulation allows combining these signals into a phase modulated composite signal that maintains a constant envelope, thereby allowing the use of a high power amplifier without signal distortion. Taking these three signals, S1, S2 and S3, an Interplex modulator generates a composite signal that includes three desired components plus an unwanted cross-product.

Signals generated by Interplex modulation are single-carrier, double sideband signals, which have a serious shortcoming and restriction. It is often desired to generate, amplify, and transmit spread-spectrum signals having multiple carriers, with each carrier modulated by one or more spreading codes.

The present invention addresses this shortcoming by providing a composite signal that includes multiple carriers, with each carrier modulated by one or more spreading codes. Moreover, the present invention provides this composite signal as a constant-envelope, single-sideband signal, thereby resulting in systems with high power and spectral efficiency.

SUMMARY OF THE INVENTION

To meet this and other needs, and in view of its purposes, the present invention provides a method of generating a composite signal having the following steps: (a) generating a plurality of sub-carriers, each sub-carrier having a different frequency position in a frequency spectrum; (b) generating a plurality of codes; (c) forming a plurality of code combinations from the plurality of codes generated in step (b), wherein a code combination is comprised of at least one code from the plurality of codes; (d) first modulating each sub-carrier using a respective one of the code combinations formed in step (c) to form a plurality of modulated sub-carriers; and (e) second modulating in-phase and quadrature components of a base carrier using the plurality of modulated sub-carriers to form the composite signal having multiple carriers.

The composite signal of the method of the invention is a constant envelope signal. The composite signal is also a single sideband signal.

Step (a) of the method may include generating the plurality of sub-carriers at frequency positions of $f_{m1}, f_{m2}, f_{m3}, \ldots f_{m_N}$, and step (e) may include generating the multiple carriers at center frequency positions of $f_o+f_{m1}, f_o+f_{m2}, f_o+f_{m3}, \ldots f_o+f_{m_N}$, where N is the number of carriers, $f_o$ is a base carrier, and $f_{m_i}$ is a sub-carrier.

The method of the invention in step (c) may include forming the following code combinations: $CC_1(t), CC_2(t), CC_3(t) \ldots CC_N(t)$, where N is the number of code combinations, and $CC_i(t)$ is a code combination at frequency position $f_o+f_i$.

The code combinations of the method of the invention have to satisfy the following condition:

$$\sum_{i=1}^{N} CC_i^2(t) = \text{constant, and}$$

$$CC_i(t)CC_j(t) = \begin{cases} const, & i = j \\ 0, & i \neq j \end{cases}.$$

The composite signal produced by the method of the invention may have the following form:

$$\sum_{i=1}^{N} CC_i(t)\cos(\omega_o + \omega_i)t,$$

where $\omega=2\pi f$.

Another embodiment of the present invention is a system for generating a composite signal of constant envelope having multiple carriers, each carrier including at least one spreading code. The system includes at least one signal generator for providing a plurality of individual sub-carriers, at least one code generator for forming a plurality of spreading codes and outputting combinations of the spreading codes as code combinations, and a base generator for forming in-phase and quadrature components of a base carrier. The system may also include a plurality of first mixers for, respectively, multiplying the plurality of sub-carriers with the code combinations to form a plurality of modulated sub-carriers, and second mixers for, respectively, multiplying the in-phase and quadrature components of the base carrier with the plurality of modulated sub-carriers. A combiner combines the multiplied in-phase and quadrature components of the base carrier to form the composite signal.

Yet another embodiment of the present invention is a system for generating a composite signal of constant envelope having multiple carriers. The system includes at least one signal generator for providing a plurality of in-phase carrier signals and quadrature carrier signals, and at least one code generator for forming a first set of code combinations and a second set of code combinations. The system may also include a first set of mixers for mixing the in-phase carrier signals with the first set of code combinations, and a second set of mixers for mixing the quadrature carrier signals with the second set of code combinations. A combiner combines output signals from the first set of mixers and the second set of mixers to form the composite signal. Each of the in-phase carrier signals have the form of $\cos(\omega_0+\omega_i)t$, and each of the quadrature carrier signals have the form of $\sin(\omega_0+\omega_i)t$, and $\omega_0$ corresponds to a base frequency and $\omega_i$ corresponds to a sub-carrier frequency.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

When generating spread-spectrum signals, constant-envelope is a desirable property, because it allows operation of a high-power amplifier (HPA) in a transmitter that is performing in a most efficient mode. That is, the operating point of the HPA may be placed close to the 1-dB saturation point, instead of further backing away from the saturation point. Backing away from the saturation point is necessary for non-constant amplitude input signals, because the higher powered signals may saturate the amplifier.

The next generation of GPS satellites, for example, will use Interplex modulation as a combining technique for the modulating (or spreading) code signals. Interplex modulation is efficient for combinations of up to three code signals, and for some combinations of more than three code signals having particular power ratios.

A general form of an N-channel Interplex signal is $$z(t) = \sqrt{2P} \sin\left[\omega_o t + \theta_1 s_1(t) + \sum_{n=2}^{N} \theta_n s_1(t) s_n(t)\right] \quad (1)$$

where $s_n(t)=d_n(t)\mathrm{sq}(\omega_n t)=\pm 1$ are code signals, and $\theta_n$ are phase modulation indices used to adjust power relationships among various codes. Furthermore, when a binary data stream $d_n(t)=\pm 1$ phase shift keys a unit amplitude square wave $\mathrm{sq}(\omega_n t)=\pm 1$ of frequency $\omega_n$, the result is again a binary wave.

In an exemplary implementation, for three codes that have equal power, the Interplex signal takes the following form:

$$z(t)=\sqrt{2P}[P(t)+M(t)]\cos 2\pi f_o t - \sqrt{2P}[C(t)-C(t)P(t)M(t)]\sin 2\pi f_o t \quad (2)$$

where P(t), C(t), and M(t) are the GPS P-code, C/A-code, and M-code signals, respectively.

It will be appreciated that Interplex modulation makes the envelope of the signal in equation (2) a constant, through the introduction of a cross-product term, C(t)P(t)M(t). The signal envelope of (2) is as follows:

$$\begin{aligned}
&\sqrt{[P(t)+M(t)]^2 + [C(t)-C(t)P(t)M(t)]^2} \\
&= \sqrt{\begin{array}{c}[P^2(t)+2P(t)M(t)+M^2(t)] + \\ [C^2(t)-2C^2(t)P(t)M(t)+C^2(t)P^2(t)M^2(t)]\end{array}} \\
&= \sqrt{[1+2P(t)M(t)+1]+[1-2P(t)M(t)+1]} \\
&= 2 \\
&= const
\end{aligned} \quad (3)$$

In deriving equation (3), the fact that the code powers are unity is used, as follows:

$$C^2(t)=P^2(t)=M^2(t)=1 \quad (4)$$

This follows because the amplitudes of the codes take on two values:

$$C(t)=\pm 1, P(t)=\pm 1, \text{ and } M(t)=\pm 1.$$

Signals generated by the Interplex method, using equation (1) are single-carrier, double sideband signals, which is a serious shortcoming. The present invention, as will be explained, overcomes this shortcoming by generating, amplifying, and transmitting spread-spectrum signals having multiple carriers, with each carrier modulated by one or more spreading codes. In addition, the present invention provides a constant-envelope signal having a single-sideband. Accordingly, the present invention advantageously results in systems having high power and spectral efficiency.

Figure 1:
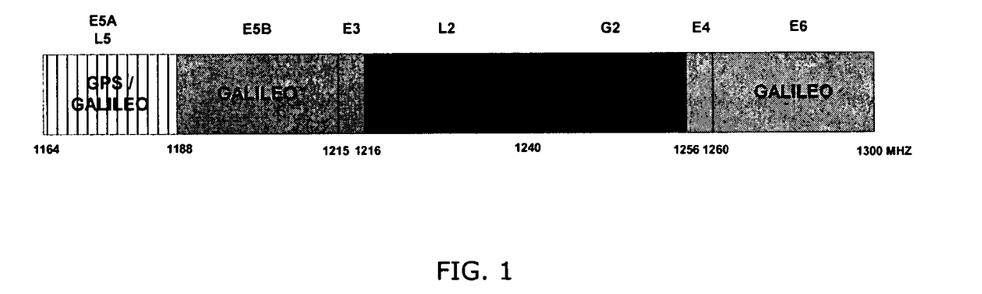
FIG. 1 is a spectral diagram showing multiple spectral bands containing modulated carriers at various frequencies generated by satellites orbiting the earth.

Using GPS as an example, the present invention may generate signals for the L2, L5, GLONASS, and Galileo band simultaneously (as shown in FIG. 1). This implies generation of carriers at frequencies 1176.45 MHz, 1207.4 MHz, 1215.5 MHz, 1227.6 MHz, 1248 MHz, 1258 MHz, and 1278.75 MHz, with an appropriate combination of codes modulating each of these carriers. The constant-envelope property of a composite signal that includes all these carriers enables the use of just one, wideband HPA, on a GPS satellite. In addition, the single side-band property of this component signal relaxes requirements for expensive and complex filtering of signals. Furthermore, the multi-carrier property of this composite signal reduces the required number of digital waveform generators.

As previously described, the Interplex method produces a single-carrier, double-sideband, constant envelope signal, but cannot generate multiple-carrier signals and cannot generate single sideband signals. The present invention, on the other hand, can generate a composite signal of multiple-carriers as a sideband in the single-sideband, suppressed carrier modulation scheme.

An exemplary embodiment of the present invention will now be described. The invention provides for the generation of a composite signal that may have an arbitrary number of carriers; that may have single-sideband frequency spectra; and may have a constant envelope. An underlying requirement of the invention is that code signals and sub-carrier signals, constituting the modulating signals, do not have overlapping spectra. Once this condition is fulfilled, a method of the invention arranges codes and cross-products of codes to modulate the sub-carriers, in a manner that produces a constant composite envelope signal.

It will be understood that multi-carrier as used by the present invention does not imply any relationship between carrier frequencies. In OFDM, for example, carriers have to be orthogonal, and in some MC-CDMA systems, carrier frequencies have to be integer multiples. In the present invention, however, carrier frequency values may be completely arbitrary, as they do not affect the operation.

A single sideband (SSB), amplitude modulated signal may be expressed as follows:

$$s(t)=\sqrt{2P}m(t)\cos 2\pi f_o t - \sqrt{2P}\hat{m}(t)\sin 2\pi f_o t \qquad (5)$$

where P is the total signal power, $f_o$ is the carrier frequency, and $\hat{m}(t)$ is the Hilbert transform of the modulating signal m(t), and $$\hat{m}(t) = \frac{1}{\pi} P.V. \int_{-\infty}^{\infty} \frac{m(s)}{t-s} ds \qquad (6)$$

where P.V. is a principle value (equation (6) has a discontinuity at t=s).

If m(t) and $\hat{m}(t)$ are chosen in a manner that results in $$m^2(t)+\hat{m}^2(t)=\text{const} \qquad (7)$$

then s(t) from equation (5) is a constant-envelope signal, and a SSB signal.

To illustrate a method of the invention, consider generating a modulated carrier at frequency $f_o+f_m$. The modulating signal then is a product of the sub-carrier signal of frequency $$f_m = \frac{\omega_m}{2\pi},$$

and a spreading code (or combination of codes), CC(t), resulting in $$m(t)=CC(t)\cos\omega_m t \qquad (8)$$

According to Bedrosian's theorem, the Hilbert transform of m(t) from equation (8) is $$\hat{m}(t)=CC(t)\sin\omega_m t \qquad (9)$$

with a condition that frequency $f_m$ (a sub-carrier) is greater than the highest component in the spectrum of the code signal CC(t).

Although, theoretically, this is not possible, since any spreading code (or combination of codes) has an infinite number of sidelobes in its spectrum, in a practical implementation it is sufficient that $f_m$ is greater than the code bandwidth. The bandwidth definition, as used herein, is the width of the signal spectrum's main lobe. In such definition, the GPS C/A code has 2-MHz bandwidth, and the P(Y) code has 20-MHz bandwidth.

Therefore, a single-carrier, SSB, constant-envelope composite signal has the following form:

$$s(t)=\sqrt{2P}CC(t)\cos(2\pi f_m t)\cos(2\pi f_o t)- \\ \sqrt{2P}CC(t)\sin(2\pi f_o t)=\sqrt{2P}CC(t)\cos 2\pi(f_o+f_m)t \qquad (10)$$

As an example for CC(t), the invention may use a code combination similar to the code combination in equation (2) to obtain $$s(t)=\sqrt{2P}[C(t)-C(t)P(t)M(t)+P(t)+M(t)]\cos(\omega_o+\omega_m)t \qquad (11)$$

Figure 2A:
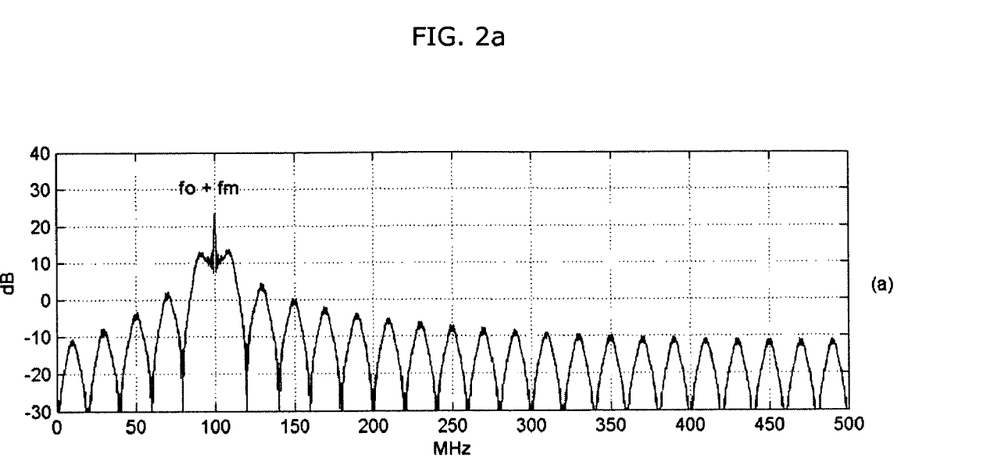
FIG. 2a is a plot of power versus frequency, illustrating a single carrier having a center carrier frequency of $f_o+f_m$, modulated by a particular code combination, in accordance with an embodiment of the present invention.
Figure 2B:
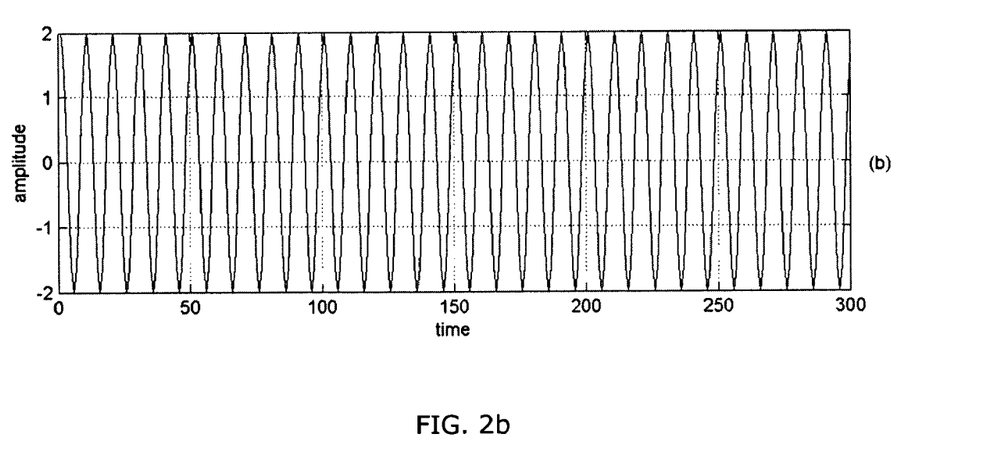
FIG. 2b is a plot of amplitude versus time of the signal whose spectrum is shown in FIG. 2a, illustrating that the signal has a constant amplitude, or a constant envelope, in accordance with an embodiment of the present invention.

The composite signal from equation (11) is single sideband, because it has no frequency components below $\omega_o$. The composite signal from equation (11) also has a constant envelope considering that $$[C(t)-C(t)P(t)M(t)+P(t)+M(t)]^2=4=\text{const} \qquad (12)$$

where the unity power property of code signals from equation (4) is used. The signal from equation (11) and its spectrum are shown in FIGS. 2a and 2b.

It is important to understand that the code combination used in equation (11) is not the only combination of spreading codes and their cross-product terms that produces a constant-envelope signal. On the contrary, there are many combinations of codes and combinations of cross products that would produce the same result.

Obviously, the previous example is not a very interesting application of the method of the present invention, because the same result may be achieved using the Interplex method, by specifying $f_o+f_m$ as the carrier frequency, instead of $f_o$. However, a more interesting method of the present invention is developed next.

Another method of the present invention may be illustrated by using two or more carriers. The result of this method cannot be achieved by the Interplex method or any other known method. That is, the present invention forms an amplitude-modulated, single sideband, multi-carrier signal, where each of the carriers may be independently modulated with different spreading codes to produce a constant envelope composite signal.

A two-carrier signal implemented according to the method of this invention, has the following form:

$$s(t) = \sqrt{2P}\,CC_1(t)\cos\omega_{m1}t \times CC_2(t)\cos\omega_{m2}t]\cos\omega_o t - \sqrt{2P}[CC_1(t)\sin\omega_{m1}t + CC_2(t)\sin\omega_{m2}t]\sin\omega_o t \quad (13)$$

where $CC_1(t)$ and $CC_2(t)$ are two different code combinations. The signal in equation (13) is single sideband, because the amplitudes of the in-phase and quadrature carriers, namely, $$[CC_1(t)\cos\omega_{m1}t + CC_2(t)\cos\omega_{m2}t]$$

and $$[CC_1(t)\sin\omega_{m1}t + CC_2(t)\sin\omega_{m2}t]$$

respectively, are a Hilbert transform pair, considering equations (8) and (9). The single-sideband property is evident, when the expression in equation (13) is simplified, as follows:

$$s(t) = \sqrt{2P}\,CC_1(t)\cos(\omega_o+\omega_{m1})t + \sqrt{2P}329\,CC_2(t)\cos(\omega_o+\omega_{m2})t \quad (14)$$

It will be appreciated that the signal of equation (14) has no spectral components below $f_o$.

The square of the envelope of the signal of equation (14) may be expressed as follows:

$$2P[CC_1(t)\cos\omega_{m1}t + CC_2(t)\cos\omega_{m2}t]^2 + 2P[CC_1(t)\sin\omega_{m1}t + CC_2(t)\sin\omega_{m2}t]^2 = 2P[CC_1^2(t) + CC_2^2(t) + CC_1(t)CC_2(t)\cos(\omega_{m1}-\omega_{m2})t] \quad (15)$$

The envelope of this signal is a constant, if the following conditions are met:

$$CC_1^2(t) + CC_2^2(t) = \text{const}$$

$$CC_1(t)CC_2(t) = 0 \quad (16)$$

Next an example implementation will be described, where GPS spreading codes (for example) are desired. In this example, the C/A code is to be placed in a band with center frequency $f_o+f_{m1}$, and the P(Y) and M codes are to be placed in a band with center frequency $f_o+f_{m2}$. (As described previously, these center frequencies may be set independently to any desired value). The method of the invention may next form the following code combinations from the GPS spreading codes:

$$CC_1(t) = C(t) - C(t)P(t)M(t)$$

$$CC_2(t) = P(t) + M(t) \quad (17)$$

Expression (13) may then be written, as follows:

$$s(t) = \sqrt{2P}\{[C(t)-C(t)P(t)M(t)]\cos\omega_{m1}t + [P(t)+M(t)]\cos\omega_{m2}t\}\cos\omega_o t - \sqrt{2P}\{[C(t)-C(t)P(t)M(t)]\sin\omega_{m1}t + [P(t)+M(t)]\sin\omega_{m2}t\}\sin\omega_o t \quad (18)$$

The envelope of the signal of equation (18) is a constant, considering the derivation in equation (3). A method of the invention, in this example, introduced a cross-product of C(t) P(t)M(t) into $CC_1(t)$ to achieve necessary cancellations.

Figure 3A:
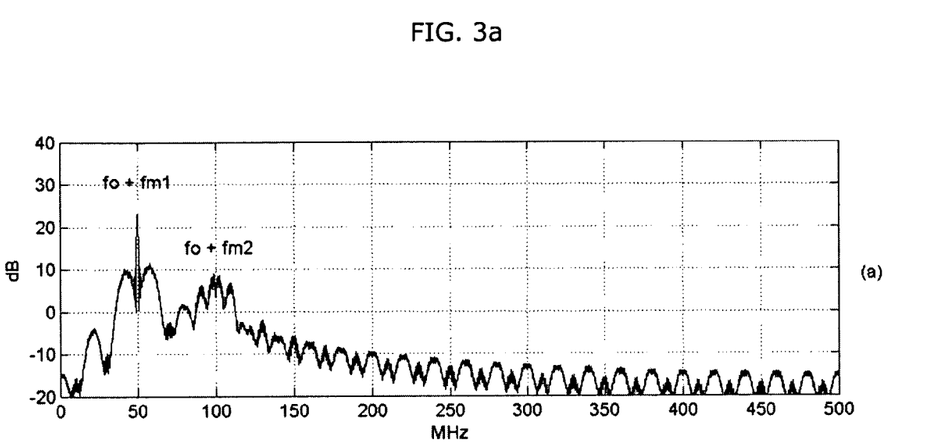
FIG. 3a is a plot of power versus frequency, illustrating two carrier signals, each modulated by a different code combination, in accordance with an embodiment of the present invention.
Figure 3B:
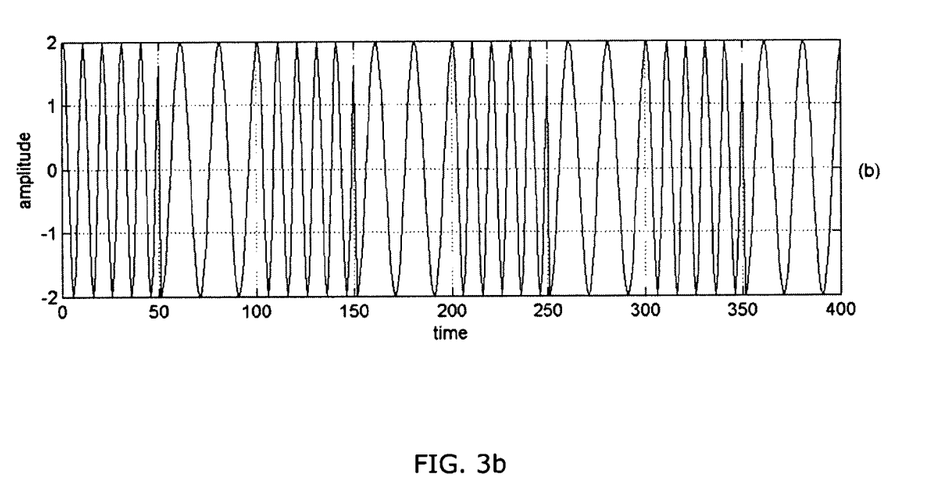
FIG. 3b is a plot of amplitude versus time, illustrating that the two carrier signal of FIG. 3a has a constant envelope, in accordance with an embodiment of the present invention.

The signal of equation (18) and its spectrum are shown in FIGS. 3a and 3b. It is pointed out again that the particular choice of codes used for spreading in this example is not unique, and that it is not unique for any number of carriers. This provides flexibility to the method of the invention, because it is possible to place desired code combinations at desired carrier frequencies.

Before generalizing a method for the present invention, another example will now be provided that used four-carriers. For this example, the constant-envelope signal has the following form:

$$s(t) = \sqrt{2P}[CC_1(t)\cos\omega_{m1}t + CC_2(t)\cos\omega_{m2}t + CC_3(t)\cos\omega_{m3}t + CC_4(t)\cos\omega_{m4}t]\cos\omega_o t - \sqrt{2P}[CC_1(t)\sin\omega_{m1}t + CC_2(t)\sin\omega_{m2}t + CC_3(t)\sin\omega_{m3}t + CC_4(t)\sin\omega_{m4}t]\sin\omega_o t \quad (19)$$

where $CC_1(t)$, $CC_2(t)$, $CC_3(t)$ and $CC_4(t)$ are code combinations that are desired at frequency positions $f_o+f_{m1}$, $f_o+f_{m2}$, $f_o+f_{m3}$ and $f_o+f_{m4}$ in the spectrum. The structure of this signal provides the single sideband property. After performing a calculation similar to the one in equation (15), it may be observed that in order to maintain the signal envelope constant, the following conditions have to be met:

$$CC_1^2(t) + CC_2^2(t) + CC_3^2(t) + CC_4^2(t) = \text{const}$$

$$CC_1(t)CC_2(t) = 0$$

$$CC_1(t)CC_3(t) = 0$$

$$CC_1(t)CC_4(t) = 0$$

$$CC_2(t)CC_3(t) = 0$$

$$CC_2(t)CC_4(t) = 0$$

$$CC_3(t)CC_4(t) = 0 \quad (20)$$

Figure 4A:
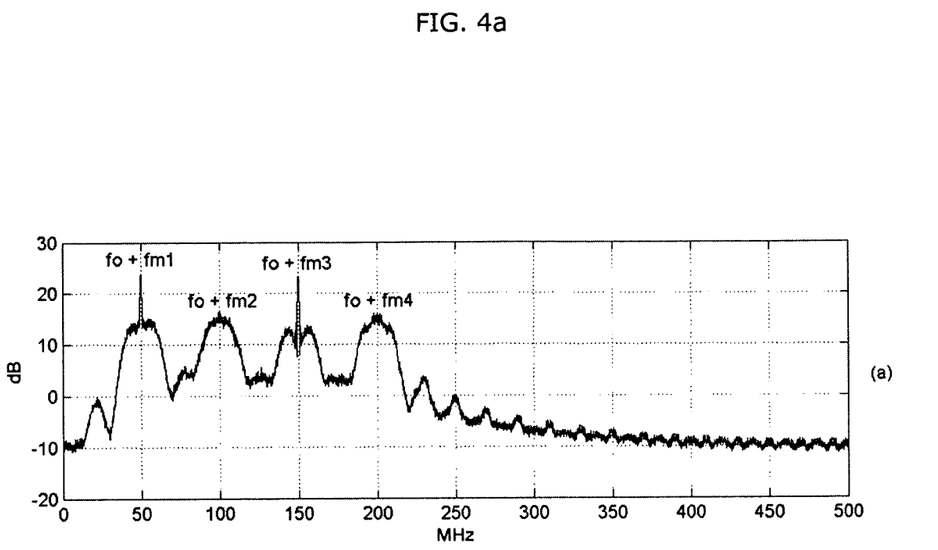
FIG. 4a is a plot of power versus frequency, illustrating four carrier signals, each modulated by a different code combination, in accordance with an embodiment of the present invention.
Figure 4B:
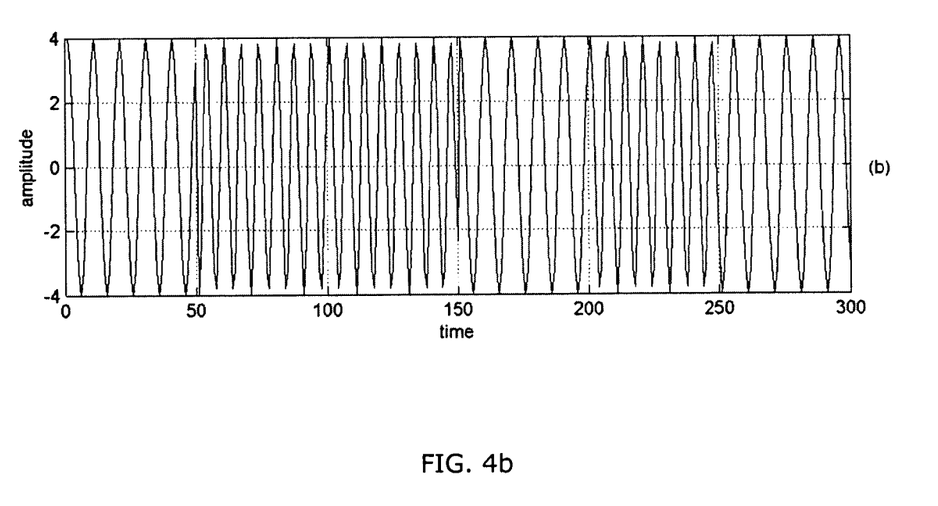
FIG. 4b is a plot of amplitude versus time showing that the four carrier signal of FIG. 4a has a constant envelope, in accordance with an embodiment of the present invention.

FIGS. 4a (spectrum) and 4b (composite constant envelope signal) show this four-carrier example with one possible arrangement of code combinations, as follows:

$$CC_1(t) = C_1(t)[1-C_2(t)C_3(t)][1-C_4(t)C_5(t)]$$

$$CC_2(t) = [C_2(t)+C_3(t)][1-C_4(t)C_5(t)]$$

$$CC_3(t) = [C_4(t)+C_5(t)][1-C_2(t)C_3(t)]$$

$$CC_4(t) = C_6(t)[1+C_2(t)C_3(t)][1+C_4(t)C_5(t)]$$

where $C_1(t)$, $C_2(t)$, $C_4(t)$ and $C_6(t)$ are C/A codes; $C_3(t)$ is a P(Y) code; and $C_5(t)$ is an M code. Instead of C/A, P(Y), and M, other codes may be used as well, such as codes to be implemented in the next generation GPS. It will be understood that this is just one of many possible arrangements, depending on a desired mixture of codes at a specific position in the spectrum. It is also possible to produce a new code using a majority vote. (Majority voting is a process of forming a resulting signal from an odd number of original code signals, which take values of +1 or −1, by taking a majority vote of the signals in every chip interval to determine the sign of the resulting signal.)

The carriers may be arbitrarily positioned in the spectrum. As an example of an arbitrary selection of four carriers, FIG. 4a illustrates carriers positioned at $f_o+f_{m1}$=50 MHz, $f_o+f_{m2}$=100 MHz, $f_o+f_{m3}$=124 MHz, and $f_o+f_{m4}$=152 MHz. This illustrates that there is no need for any special relationship between carrier frequencies.

Finally, as a general case, the present invention produces a single sideband, constant envelope, composite signal comprised of N carriers, having the following form:

$$s(t) = \left[\sum_{i=1}^{N} CC_i(t)\cos\omega_i t\right]\cos\omega_o t - \left[\sum_{i=1}^{N} CC_i(t)\sin\omega_i t\right]\sin\omega_o t \quad (21)$$

$$= \sum_{i=1}^{N} CC_i(t)\cos(\omega_o+\omega_i)t$$

where $CC_i(t)$ are code combinations at respective center frequency positions $f_o+f_i$. As defined herein, $f_o+f_i$ is a carrier at center frequency position $f_o+f_i$, where $f_o$ is a base carrier and $f_i$ is a sub-carrier.

It will be appreciated that this generalized method of the present invention is completely backward compatible with the existing GPS system. In this manner, any standard receiver may receive signals generated by the present invention. Modifications of the GPS receiver or any GPS receiver updates are not necessary.

In general, the signal structure that provides the SSB property and the constant envelope signal are as follows:

$$\sum_{i=1}^{N} CC_i^2(t) = const \quad (22)$$

$$CC_i(t)CC_j(t) = \begin{cases} const, & i = j \\ 0, & i \neq j \end{cases}$$

Conditions shown in equation (22) do not restrict placement of any number of code signals, in any combination, on any of the carrier frequencies. These conditions just determine the type and number of additional cross-product terms necessary for term cancellations to provide a constant modulated signal envelope.

It will be further understood that the method of the invention is not restricted to the generation of GPS signals. Its theoretical basis is completely general and, therefore, its applicability is very broad. It may be used for generating spread-spectrum and non-spread-spectrum signals, in all circumstances where single sideband, constant envelope, multi-carrier signals are desired. Their use is advantageous in combination with high-power amplifiers, but their use is not restricted to such applications. The generalized method of the present invention is also applicable to both wireless and wired communications. GPS code signals have been used herein for illustrative purposes only, and codes other than the ones specified may be readily used by this method.

Figure 5:
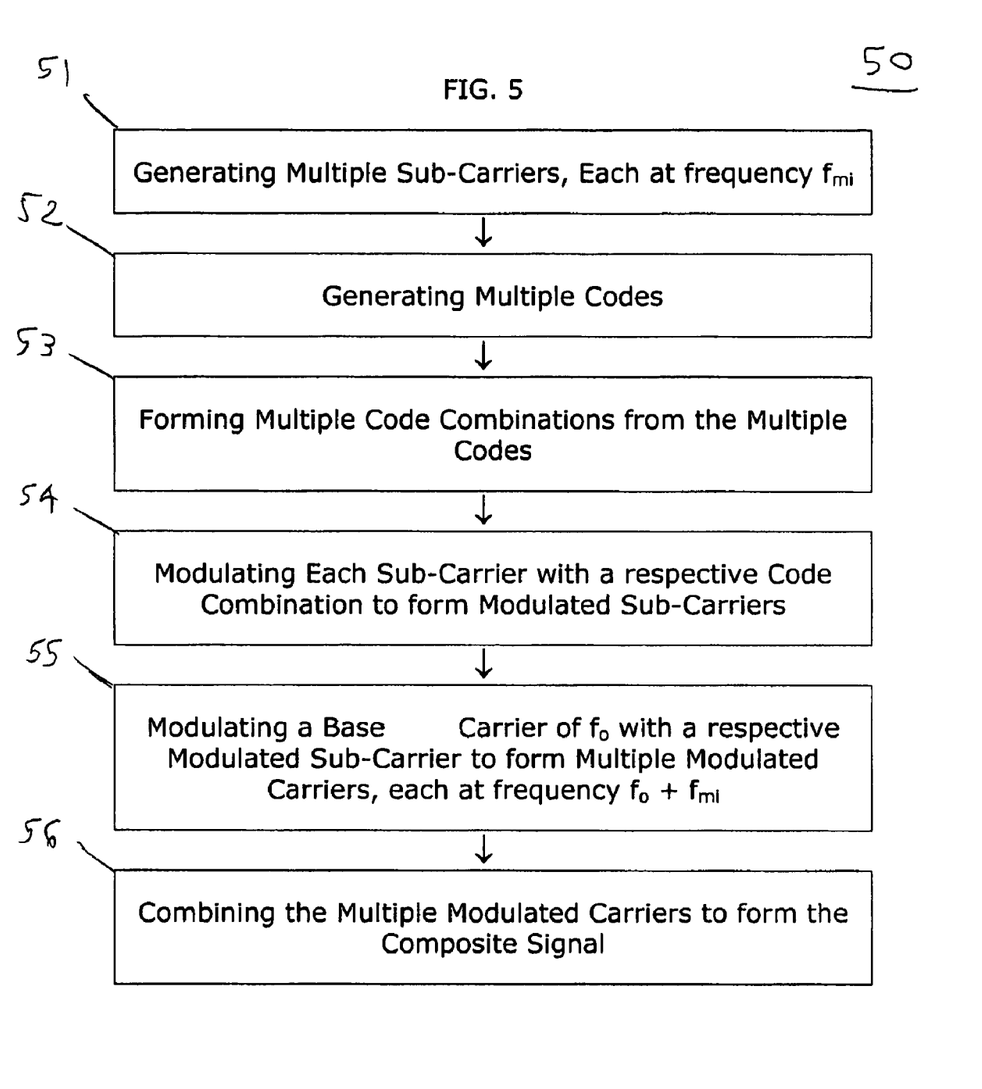
FIG. 5 is an exemplary method of the present invention for generating single sideband, constant envelope, multiple carrier, spread spectrum signals with multiple spreading codes.

Referring now to FIG. 5, there is shown an exemplary method of generating single sideband, constant envelope, spread spectrum signals with multiple spreading codes. The method, generally designated as 50, begins in step 51 by generating multiple sub-carriers. Each generated sub-carrier has a spectral position at frequency $f_{m_i}$. For example, the sub-carriers may take on the frequency values of $f_{m1}$, $f_{m2}$, $f_{m3}$, ..., $f_{mN}$. Step 52 generates multiple spreading codes. For example, the spreading codes may include individual GPS codes of the C/A code, P(Y) code and M code.

From the multiple individual codes generated by step 52, the method forms multiple code combinations by way of step 53. These multiple code combinations include at least one or more of the individual codes generated in step 52. For example, the code combinations may include $CC_1(t)$, $CC_2(t)$, ... $CC_N(t)$.

Each of the code combinations formed in step 53 may now modulate, by way of step 54, a respective sub-carrier generated in step 51. For example, code combination $CC_1(t)$ may modulate sub-carrier $\cos(\omega_1 t)$ and $\sin(\omega_1 t)$. It will be appreciated that $\cos(\omega_1 t)$ is the in-phase sub-carrier signal and $\sin(\omega_1 t)$ is the quadrature sub-carrier signal. Both, however, have the same frequency.

As known, the in-phase sub-carrier signal and the quadrature sub-carrier signal are out-of-phase with respect to each other by 90 degrees.

As another example, code combination $CC_2(t)$ may modulate another sub-carrier of $\cos(\omega_2 t)$ and $\sin(\omega_2 t)$. It will be understood that $\sin(\omega_2 t)$ is 90 degrees out-of-phase with respect to $\cos(\omega_2 t)$. Both have the same frequency.

Each of the resulting modulated sub-carriers may next modulate, in step 55, a base carrier of $f_o$ to form multiple modulated carriers. Each of the multiple modulated carriers are formed at a center frequency position of $f_o+f_{mi}$. Similar to step 54, step 55 modulates the base carrier at $\cos(\omega_o t)$ and $\sin(\omega_o t)$. The base carrier of $\cos(\omega_o t)$ and $\sin(\omega_o t)$ are 90 degrees out-of-phase with respect to each other.

Figure 6:
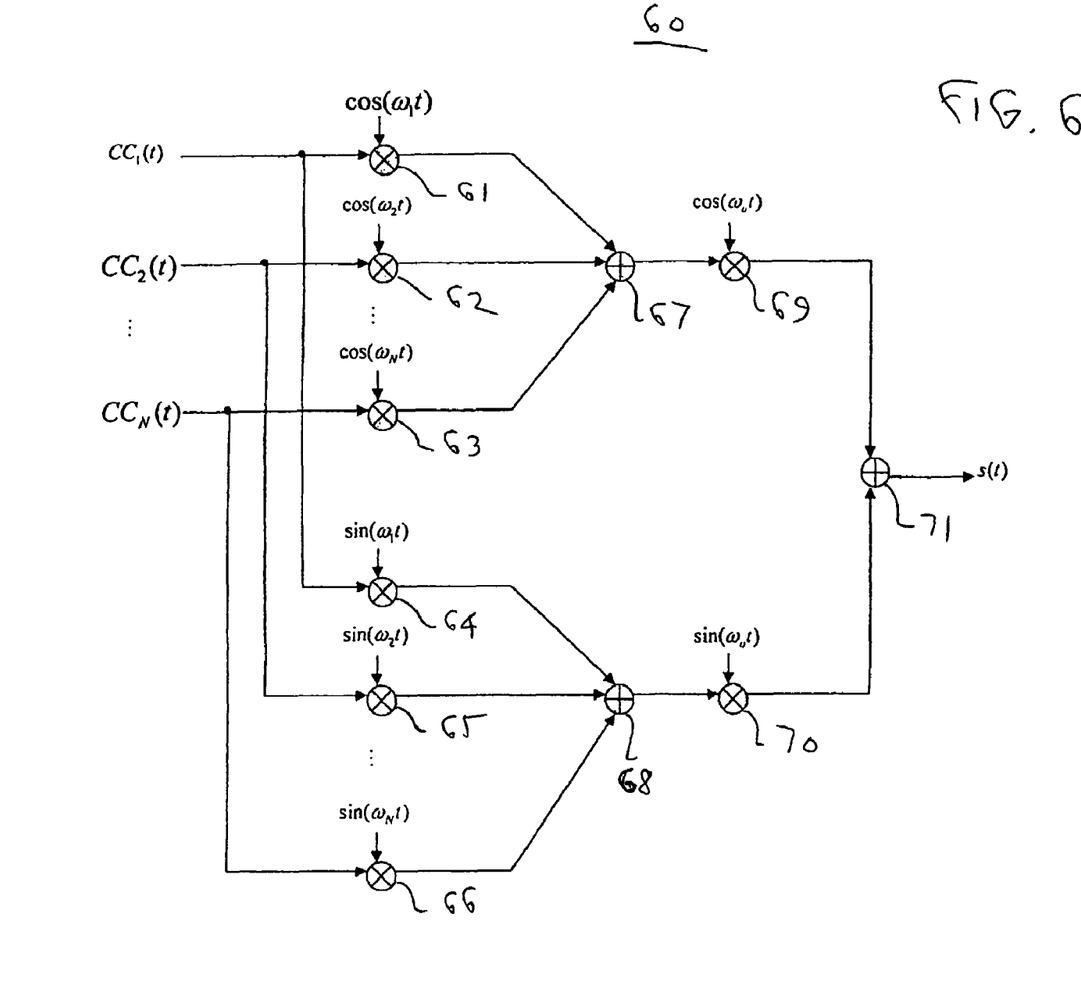
FIG. 6 is a schematic diagram of a system for generating single sideband, constant envelope, multiple carrier, spread spectrum signals with multiple spreading codes, in accordance with an embodiment of the present invention.

The method next combines the multiple modulated carriers to form a composite signal in step 56. It will be appreciated that (as best shown in FIG. 6) combining of the multiple modulated carriers requires an adder which combines all the respective modulated sub-carriers of the in-phase signals and a separate adder that combines all the modulated sub-carriers of the quadrature signals. Furthermore, another adder is required to combine the modulated in-phase carrier and the modulated quadrature carrier.

Referring next to FIG. 6, there is shown an exemplary system for generating single sideband, constant envelope signals with multiple spreading codes. The system, generally designated as 60, includes multiple input signals of various code combinations, $CC_1(t)$, $CC_2(t)$, ... $CC_N(t)$. System 60 includes mixers 61, 62, 63, 64, 65 and 66 for separately mixing each of the code combinations with an in-phase sub-carrier of $\cos(\omega_i t)$ and separately mixing each of the code combinations with a quadrature sub-carrier of $\sin(\omega_i t)$. The resulting modulated in-phase sub-carriers are combined by way of adder 67. Moreover, the resulting quadrature modulated sub-carriers are combined by adder 68.

The in-phase modulated sub-carriers output from adder 67 are mixed with the in-phase base carrier at $f_o$ of $\cos(\omega_0 t)$. This mixing, or modulating, is performed by mixer 69. Similarly, the quadrature modulated sub-carriers output from adder 68 are mixed, or modulated, with $\sin(\omega_0 t)$ by way of mixer 70.

The output from mixer 69 and the output from mixer 70 are combined by adder 71 to form the composite signal of $s(t)$.

Other embodiments of the invention will now be described with reference to FIGS. 7 and 8. These embodiments are similar to the embodiments shown in FIGS. 5 and 6, respectively, in that they generate single sideband, constant envelope signals with arbitrary number of modulated carriers. The embodiments shown in FIGS. 7 and 8, however, place the spreading codes in separate in-phase and quadrature branches of the carriers.

Figure 7:
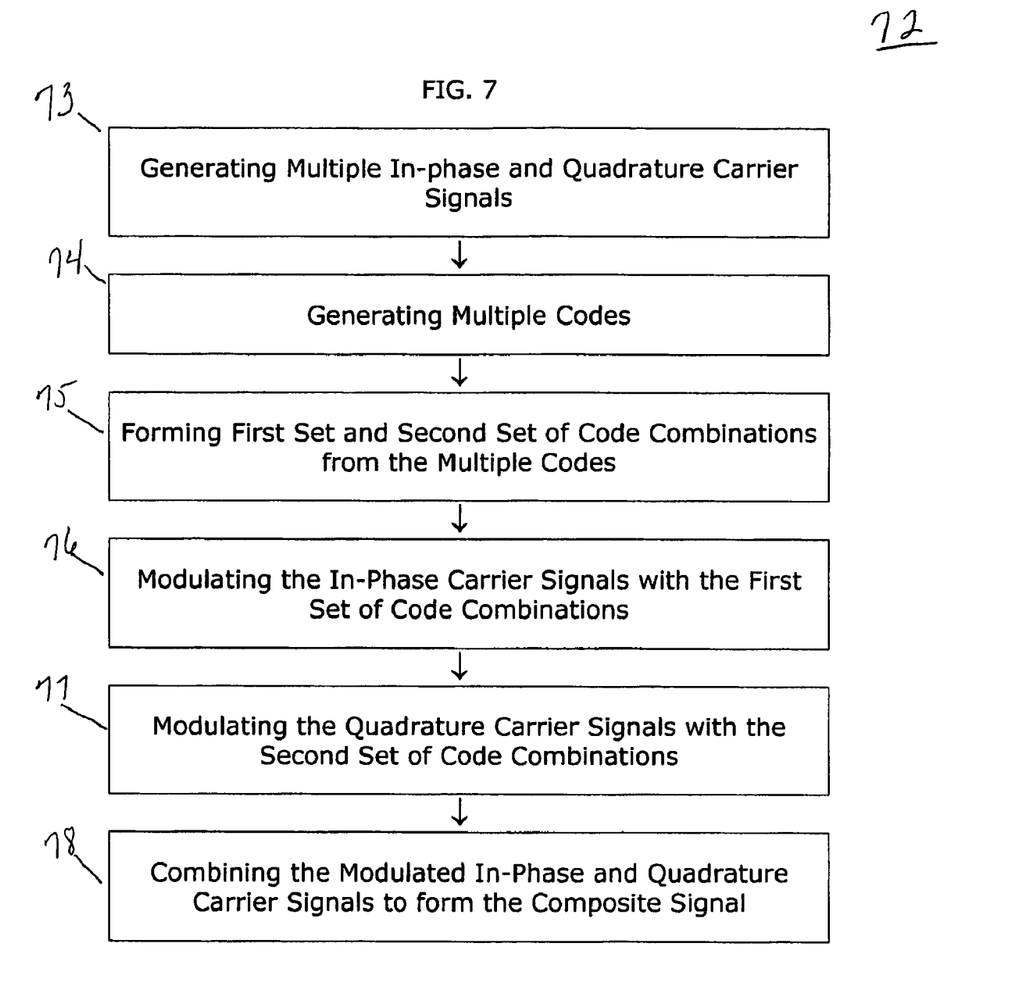
FIG. 7 is another method of the present invention for generating multi code, quadrature multi-carrier, single sideband, constant envelope, spread spectrum signals, in accordance with an embodiment of the present invention.
Figure 8:
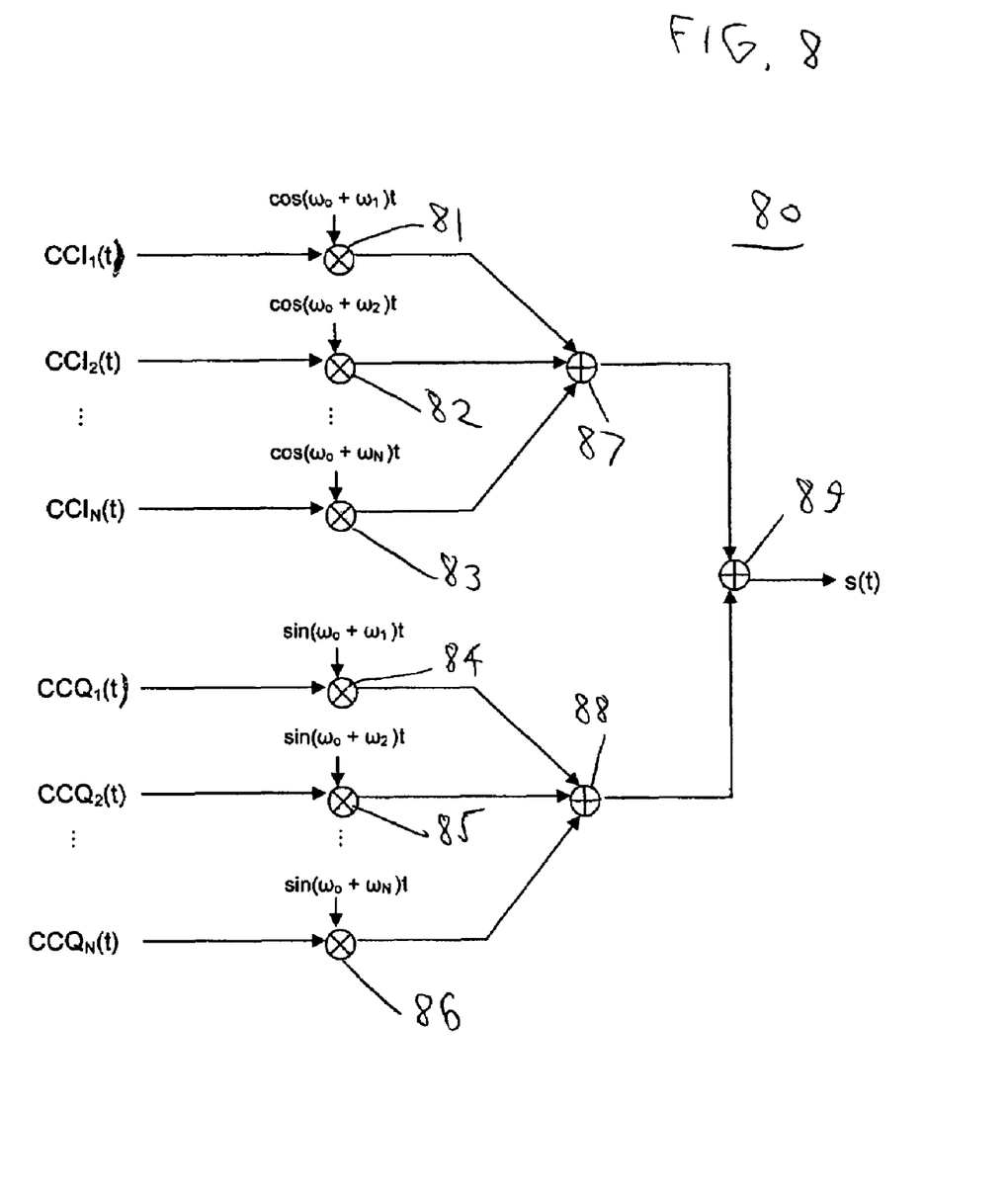
FIG. 8 is a block diagram of another system for generating multi code, quadrature multi-carrier, single sideband, constant envelope, spread spectrum signals, in accordance with an embodiment of the present invention.

As an example of the embodiments shown in FIGS. 7 and 8, first consider a composite signal with two carriers positioned at frequencies $f_o+f_{m1}$ and $f_o+f_{m2}$. The composite signal takes on the following form:

$$s(t)=\sqrt{P}CCI_1(t)\cos(\omega_o+\omega_{m1})t+\sqrt{P}CCQ_1\sin(\omega_o+\omega_{m1})t+ \\ \sqrt{P}CCI_2\cos(\omega_o+\omega_{m2})t+\sqrt{P}CCQ_2\sin(\omega_o+\omega_{m2})t \quad (23)$$

where $CCI_1(t)$ and $CCI_2(t)$ are code combinations modulating the in-phase carriers, and $CCQ_1(t)$ and $CCQ_2(t)$ are code combinations modulating the quadrature carriers.

After expanding the sine and cosine functions in equation (23) and grouping the terms, the following may be derived:

$$s(t)=\sqrt{2P}[CCI_1(t)\cos\omega_{m1}t+CCI_2(t)\cos\omega_{m2}t+ \\ CCQ_1(t)\sin\omega_{m1}t+CCQ_2(t)\sin\omega_{m2}t]\cos\omega_o t- \\ \sqrt{2P}[CCI_1(t)\sin\omega_{m1}t+CCI_2(t)\sin\omega_{m2}t- \\ CCQ_1(t)\cos\omega_{m1}t-CCQ_2(t)\cos\omega_{m2}t]\sin\omega_o t \quad (24)$$

This composite signal is single-sideband, since the in-phase carrier amplitude of $$[CCI_1(t)\cos\omega_{m1}t+CCI_2(t)\cos\omega_{m2}t+CCQ_1(t)\sin\omega_{m1}t+ \\ CCQ_2(t)\sin\omega_{m2}t] \quad (25)$$

and the quadrature carrier amplitude of $$[CCI_1(t)\sin\omega_{m1}t + CCI_2(t)\sin\omega_{m2}t - CCQ_1(t)\cos\omega_{m1}t - CCQ_2(t)\cos\omega_{m2}t] \quad (26)$$

are Hilbert transform pairs, following the development from equations (8) and (9).

To determine the conditions for having a constant envelope signal, the expressions in equations (25) and (26) are squared and added. After grouping the terms, the square of the signal envelope becomes $$2P\{CCI_1^2(t) + CCI_2^2(t) + CCQ_q^2(t) + CCQ_2^2(t) + [CCI_1(t) CCI_2(t) + CCQ_1(t)CCQ_2(t)]\cos(\omega_{m1}-\omega_{m2})t - [CCI_2(t)CCQ_2(t) - CCI_2(t)CCQ_1(t)]\sin(\omega_{m1}-\omega_{m2})t \quad (27)$$

It is clear that the expression in equation (25) may be constant, if the following conditions are imposed:

$$CCI_1^2(t) + CCI_2^2(t) + CCQ_1^2(t) + CCQ_2^2(t) = \text{const}$$

$$CCI_1(t)CCI_2(t) + CCQ_1(t)CCQ_2(t) = 0$$

$$CCI_1(t)CCQ_2(t) - CCI_2(t)CCQ_1(t) = 0 \quad (28)$$

This represents the conditions that a two-carrier spread spectrum signal, generated by the present invention, has to meet in order to have a constant envelope.

In a general case, for N carriers, the resulting composite signal has the following form:

$$s(t) = \sum_{i=1}^{N} [CCI_i(t)\cos(\omega_o + \omega_i)t + CCQ_i(t)\sin(\omega_o + \omega_i)t] \quad (29)$$

where CCI(t) and CCQ(t) are code combinations for spreading the in-phase and quadrature carrier components, respectively. CCI(t) and CCQ(t), in addition to containing pure codes, in general, also contain terms that are products of pure codes (these are usually called cross-products.)

By expanding the trigonometric functions in equation (29) and collecting the terms, the following expression is obtained:

$$s(t) = \cos\omega_o t \sum_{i=1}^{N} [CCI_i(t)\cos\omega_i t + CCQ_i(t)\sin\omega_i t] - \sin\omega_o t \sum_{i=1}^{N} [CCI_i(t)\sin\omega_i t - CCQ_i(t)\cos\omega_i t] \quad (30)$$

The square of the envelope of the composite signal, from equation (28) is $$\left\{\sum_{i=1}^{N} [CCI_i(t)\cos\omega_i t + CCQ_i(t)\sin\omega_i t]\right\}^2 + \left\{\sum_{i=1}^{N} [CCI_i(t)\sin\omega_i t - CCQ_i(t)\cos\omega_i t]\right\}^2 \quad (31)$$

From considerations similar to the considerations of equations (27) and (28), the following conditions need to be fulfilled:

$$\sum_{i=1}^{N} [CCI_i^2(t) + CCQ_i^2(t)] = \text{const} \quad (32)$$

and $$CCI_i(t)CCI_j(t) + CCQ_i(t)CCQ_j(t) = 0 \quad (i=1, \ldots, N; j=1, \ldots, N; i \neq j)$$

$$CCI_j(t)CCQ_i(t) - CCI_i(t)CCQ_j(t) = 0 \quad (33)$$

If these conditions are met, then the multi-carrier composite signal from equation (29) forms a constant envelope.

As previously described, these methods are not restricted to the generation of GPS signals. These methods may be used for generating spread-spectrum and non-spread-spectrum signals, in all circumstances where single sideband, constant envelope, multi-carrier signals are described. These methods are also applicable to both wireless and wired combinations.

Referring now to FIG. 7, there is shown another exemplary method of generating multi code, quadrature multi-carrier, single sideband, constant envelope, spread spectrum signals. The method, generally designated as 72, begins in step 73 by generating multiple in-phase and quadrature carrier signals. Each generated carrier signal has a center frequency position of $f_o + f_i$. Each in-phase carrier signal is equal to $\cos(\omega_0 + \omega_i)t$. Each quadrature carrier signal is equal to $\sin(\omega_0 + \omega_i)t$.

The method in step 74 generates multiple codes. For example, the spreading codes may include individual GPS codes of the C/A code, P(Y) code and M code.

The method next, in step 75, forms a first set of code combinations from the multiple codes generated in step 74. For example, the first set of multiple code combinations may be $CCI_1(t), CCI_2(t), \ldots CCI_N(t)$. Step 75 also forms a second set of code combinations from the multiple codes generated in step 74. For example, the second set of code combinations may include $CCQ_1(t), CCQ_2(t), \ldots, CCQ_N(t)$.

The method then enters step 76 and modulates the in-phase carrier signals with the first set of code combinations. For example, code combination $CCI_1(t)$ modulates the in-phase carrier of $\cos(\omega_0 + \omega_1)t$, as shown.

The method also enters step 77 and modulates the quadrature carrier signals with the second set of code combinations. For example, code combination $CCQ_1(t)$ modulates the quadrature carrier of $\sin(\omega_0 + \omega_2)t$, as shown.

The method finally enters step 78 and combines the modulated in-phase carrier signals and the modulated quadrature carrier signals to form the composite signal of s(t).

Referring next to FIG. 8, there is shown another exemplary system for generating multi code, quadrature multi-carrier, single sideband, constant envelope, spread spectrum signals. The system, generally designated as 80, includes multiple input signals having various code combinations. A first set of code combinations, as shown, are $CCI_1(t), CCI_2(t), \ldots$ and $CCI_N(t)$. Also shown, are a second set of code combinations, namely $CCQ_1(t), CCQ_2(t), \ldots,$ and $CCQ_N(t)$.

System 80 includes mixers 81, 82, 83, 84, 85 and 86. Each of the mixers separately multiplies a respective code combination with either an in-phase carrier or a quadrature carrier. The in-phase carriers, as shown, are $\cos(\omega_0 + \omega_1)t, \cos(\omega_0 + \omega_2)t, \ldots$ and $\cos(\omega_0 + \omega_N)t$. The quadrature carriers, as shown, are $\sin(\omega_0 + \omega_1)t, \sin(\omega_0 + \omega_2)t, \ldots$ and $\sin(\omega_0 + \omega_N)t$.

The output from mixers 81-86 are provided, respectively, to adder 87 and adder 88. Each adder combines the output of the modulated quadrature carrier signals and the modulated in-phase carrier signals. A final adder, designated 89, combines the respective outputs of adder 87 and adder 88 to form the composite signal of s(t).

Although the invention is illustrated and described herein with reference to specific embodiments, the invention is not intended to be limited to the details shown. Rather, various modifications may be made in the details within the scope and range of equivalents of the claims and without departing from the invention.

Figure 9:
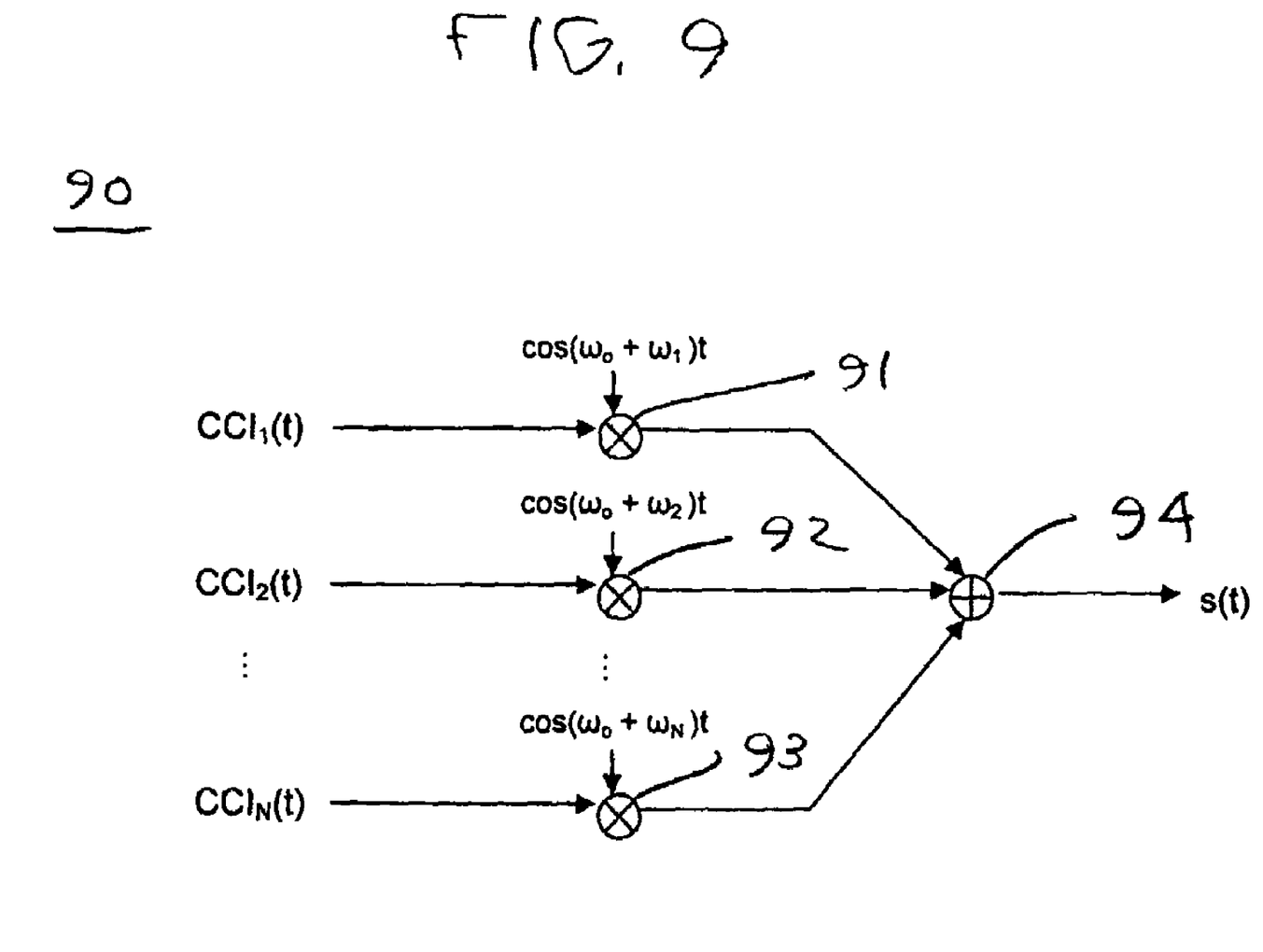
FIG. 9 is a block diagram of yet another system for generating multi code, quadrature multi-carrier, single sideband, constant envelope, spread spectrum signals, in accordance with an embodiment of the present invention.
Figure 10:
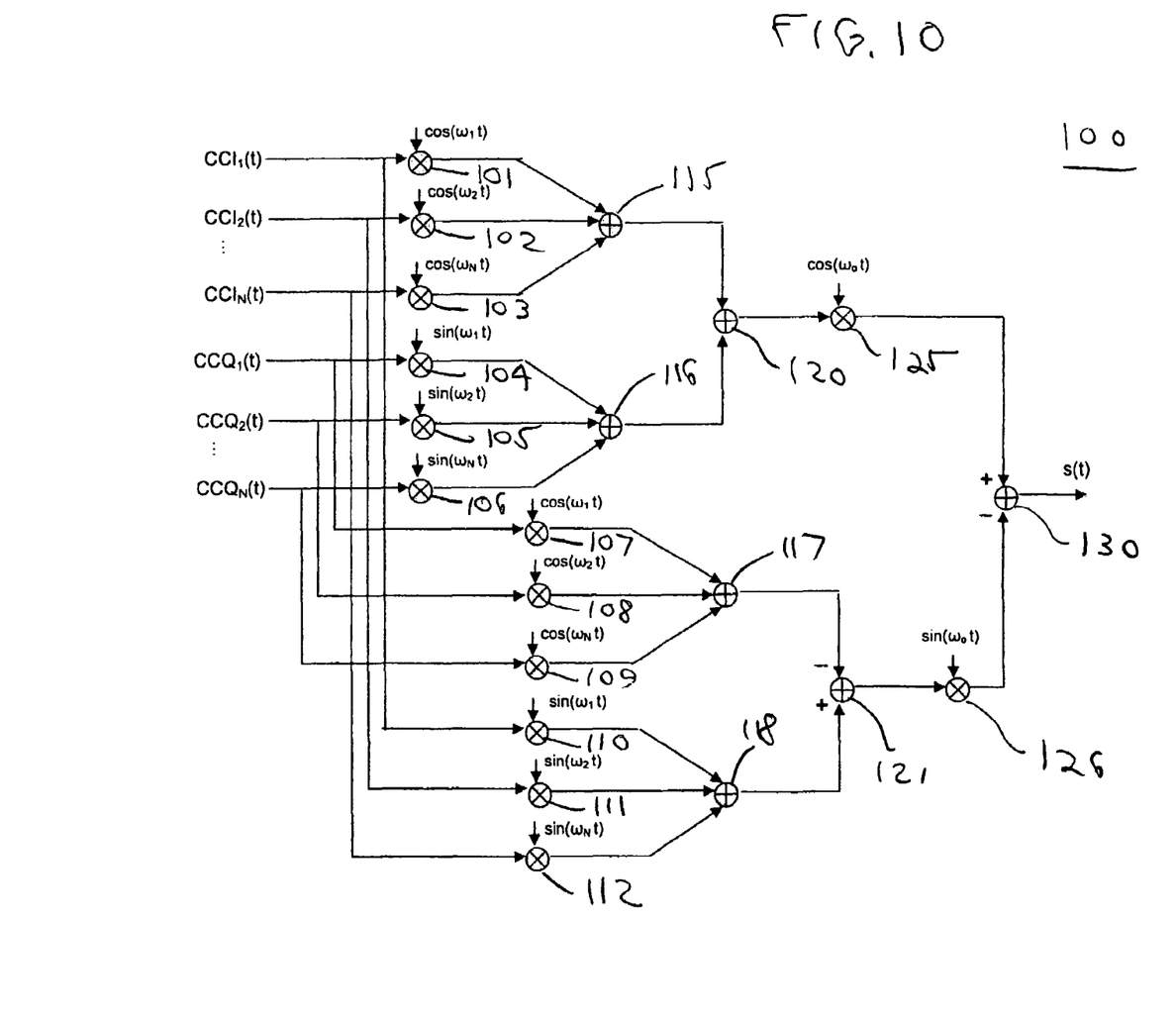
FIG. 10 is a block diagram of still another system for generating multi code, multi-carrier, single sideband, constant envelope, spread spectrum signals, in accordance with an embodiment of the present invention.

For example, other embodiments of the present invention may be seen in FIG. 9 and FIG. 10.

Referring first to FIG. 9, there is shown system 90 including multiple input signals having various code combinations. As shown, the set of code combinations are $CCI_1(t)$, $CCI_2(t)$, . . . and $CCI_N(t)$. System 90 includes mixers 91, 92, . . . 93. Each of the mixers separately multiplies a respective code combination with an in-phase carrier. The in-phase carriers, as shown, are $\cos(\omega_0+\omega_1)t$, $\cos(\omega_0+\omega_2)t$, . . . and $\cos(\omega_0+\omega_N)t$. The output from mixers 91-93 are provided to adder 94. The adder combines the output of the modulated in-phase carrier signals to form the composite signal of s(t).

System 100 of FIG. 10 illustrates still another embodiment of the present invention. System 100 includes multiple input signals having various code combinations. A first set of code combinations, as shown, are $CCI_1(t)$, $CCI_2(t)$, . . . and $CCI_N(t)$. Also shown, are a second set of code combinations, namely $CCQ_1(t)$, $CCQ_2(t)$, . . . , and $CCQ_N(t)$. System 100 includes a first set of mixers 101-106 and a second set of mixers 107-112. The first set of mixers and the second set of mixers, respectively, multiply the first and second sets of code combinations to form a plurality of modulated in-phase carrier signals and a plurality of modulated quadrature carrier signals. The modulated in-phase carrier signals and the modulated quadrature carrier signals are combined by adders 115, 116, 117 and 118. The output signals from adders 115 and 116 are combined by adder 120. The output signals from adders 117 and 118 are combined (subtracted) by adder 121. The combined output signals from adder 120 modulate an in-phase base carrier signal, by way of mixer 125. Similarly, the combined output signals from adder 121 modulate a quadrature base signal, by way of mixer 126. Finally, the in-phase modulated base carrier signal and the quadrature modulated base carrier signal are combined by adder 130 (subtracted) to form the composite signal of s(t).

It will be appreciated that system 90 of FIG. 9 is an alternate implementation of a system for forming the composite signal generated according to equation (21). System 100 of FIG. 10 in another implementation of a system for forming the composite signal generated according to equation (30).

What is claimed is:

1. A method implemented in a system for generating a composite signal comprising the steps of:
   (a) generating a plurality of sub-carriers, each sub-carrier having a different frequency position in a frequency spectrum;
   (b) generating a plurality of codes;
   (c) forming a plurality of code combinations from the plurality of codes generated in step (b), wherein a code combination is comprised of at least two codes from the plurality of codes;
   (d) first modulating each sub-carrier using a respective one of the code combinations formed in step (c) to form a plurality of modulated sub-carriers; and
   (e) second modulating in-phase and quadrature components of a base carrier using the plurality of modulated sub-carriers to form the composite signal having multiple carriers;

step (c) includes forming the following code combinations: $CC_1(t), CC_2(t), CC_3(t) \ldots CC_N(t)$ where N is the number of code combinations, N=2 or more, and $CC_i(t)$ is a code combination at frequency position $f_o+f_i$; and $$\sum_{i=1}^{N} CC_i^2(t) = \text{constant}$$

and $$CC_i(t)CC_j(t) = \begin{cases} const, & i=j \\ 0, & i \neq j \end{cases}.$$

2. The method of claim 1 wherein
the composite signal is a constant envelope signal.
3. The method of claim 1 wherein
the composite signal is a single sideband signal.
4. The method of claim 1 wherein
the number of codes is not equal to the number of carriers.
5. The method of claim 1 wherein
the composite signal has the following form:

$$\sum_{i=1}^{N} CC_i(t)\cos(\omega_o + \omega_i)t$$

where $\omega=2\pi f$.

6. The method of claim 1 wherein
step (b) includes generating at least one code from a plurality of codes used by Global Positioning System (GPS).
7. The method of claim 1 wherein
step (e) includes adding second modulating in-phase components of the base carrier and second modulated quadrature components of the base carrier to form the composite signal.
8. The method of claim 1 wherein
step (a) includes generating the plurality of sub-carriers at frequency positions of $f_{m1}, f_{m2}, f_{m3}, \ldots, f_{m_N}$, and
step (e) includes generating the multiple carriers at center frequency positions of $f_o+f_{m1}, f_o+f_{m2}, f_o+f_{m3}, \ldots, f_o+f_{m_N}$
where N is the number of carriers, and $N \geq 1$,
$f_o$ is a base carrier, and
$f_{mi}$ is a sub-carrier, where $m_i=1$ to N.
9. A system for generating a composite signal of constant envelope having multiple carriers, each carrier including at least one spreading code, comprising
at least one signal generator for providing a plurality of individual sub-carriers,
at least one code generator for forming a plurality of spreading codes and outputting combinations of the spreading codes as code combinations,
a plurality of first mixers for, respectively, multiplying the plurality of sub-carriers with the code combinations to form a plurality of modulated sub-carriers, each modulated sub-carrier having a different frequency,
a base generator for forming in-phase and quadrature components of a base carrier,
second mixers for, respectively, multiplying the in-phase and quadrature components of the base carrier with the plurality of modulated sub-carriers, and a combiner for combining the multiplied in-phase and quadrature components of the base carrier to form the composite signal, the code combinations include:

$CC_1(t), CC_2(t), CC_3(t) \ldots CC_N(t)$ where N is the number of code combinations, N=2 or more, and $CC_i(t)$ is a code combination at frequency position $f_o+f_i$; and $$\sum_{i=1}^{N} CC_i^2(t) = \text{constant}$$

and $$CC_i(t)CC_j(t) = \begin{cases} const, & i = j \\ 0, & i \neq j \end{cases}.$$

10. The system of claim 9 wherein the composite signal is a single side band signal.

11. The system of claim 9 wherein the at least one signal generator provides a first set of multiple sub-carriers and a second set of multiple sub-carriers, the first set of multiple sub-carriers includes an in-phase component for each of the multiple sub-carriers, and the second set of multiple sub-carriers includes a quadrature component for each of the multiple sub-carriers.

12. The system of claim 11 including an adder for adding the in-phase components of multiplied sub-carriers, and providing an output to one of the second mixers.

13. The system of claim 9 wherein the plurality of sub-carriers are placed at the following frequency positions:

$f_{m1}, f_{m2}, f_{m3}, \ldots, f_{mN}$, the base carrier is placed at a frequency position of $f_o$, and the composite signal includes carriers at the following center frequencies:

$f_0+f_{m1}, f_o+f_{m2}, f_o+f_{m3}, \ldots, f_0+f_{mN}$ where N is the number of carriers, and N≧1, and $f_{mi}$ is a sub-carrier, where $m_i$=1 to N.

14. A system for generating a composite signal of constant envelope having multiple carriers, comprising at least one signal generator for providing a plurality of in-phase carrier signals and quadrature carrier signals, at least one code generator for forming a first set of code combinations and a second set of code combinations, a first set of mixers for mixing the in-phase carrier signals with the first set of code combinations, each in-phase carrier signal having a different frequency, a second set of mixers for mixing the quadrature carrier signals with the second set of code combinations, each quadrature carrier signal having a different frequency, and a combiner for combining output signals from the first set of mixers and the second set of mixers to form the composite signal, the first and second sets of code combinations include:

$CC_1(t), CC_2(t), CC_3(t) \ldots CC_N(t)$ where N is the number of code combinations, N=2 or more, and $CC_i(t)$ is a code combination at frequency position $f_o+f_i$; and $$\sum_{i=1}^{N} CC_i^2(t) = \text{constant}$$

and $$CC_i(t)CC_j(t) = \begin{cases} const, & i = j \\ 0, & i \neq j \end{cases}.$$

15. The system of claim 14 wherein the composite signal is a single side band signal.

16. The system of claim 14 wherein the at least one code generator forms a plurality of GPS type codes, and outputs the first and second sets of code combinations based on the formed GPS type codes.

17. The system of claim 16 wherein one code combination of the first and second sets of code combinations includes at least one code of the GPS type codes, and another code combination of the first and second sets of code combinations includes a cross-product of some or all of the GPS type codes.

18. The system of claim 14 wherein each of the in-phase carrier signals is of the following form:

$\cos(\omega_0+\omega_i)t$, and each of the quadrature carrier signals is of the following form:

$\sin(\omega_0+\omega_i)t$, and $\omega_0$ corresponds to a base frequency and $\omega_i$ corresponds to a sub-carrier frequency.

19. A system for generating a composite signal of constant envelope having multiple carriers, each carrier including at least one spreading code, comprising a plurality of signal generators for forming a first set of sub-carriers and a second set of sub-carriers, wherein the first and second sets of sub-carriers include in-phase components and quadrature components, a plurality of code generators for forming a first set of code combinations and a second set of code combinations, a first set of mixers for modulating the first set of sub-carriers with the first and second sets of code combinations, each sub-carrier in the first set having a different frequency, a second set of mixers for modulating the second set of sub-carriers with the first and second sets of code combinations, each sub-carrier in the second set having a different frequency, a plurality of adders for combining modulated sub-carriers output from the first and second sets of mixers, a base generator for forming in-phase and quadrature components of a base carrier, a third set of mixers for, respectively, modulating the in-phase and quadrature components of the base carrier with the combined modulated sub-carriers, and a combiner for combining the modulated in-phase and quadrature components of the base carrier to form the composite signal, the first and second sets of code combinations include:

$CC_1(t), CC_2(t), CC_3(t) \ldots CC_N(t)$ where N is the number of code combinations, N=2 or more, and $CC_i(t)$ is a code combination at frequency position $f_o+f_i$; and $$\sum_{i=1}^{N} CC_i^2(t) = \text{constant}$$

and $$CC_i(t)CC_j(t) = \begin{cases} const, & i = j \\ 0, & i \neq j \end{cases}.$$

20. The system of claim 19 wherein each of the in-phase components is of the following form:

$\cos(\omega_0+\omega_i)t$, and each of the quadrature components is of the following form:

$\sin(\omega_0+\omega_i)t$, and $\omega_0$ corresponds to a base carrier frequency and $\omega_i$ corresponds to a sub-carrier frequency.

* * * * *